(12) United States Patent
Chi et al.

(10) Patent No.: US 9,703,819 B2
(45) Date of Patent: Jul. 11, 2017

(54) GENERATION AND USE OF DELTA INDEX

(71) Applicant: International Business Machines Corporation, Armonk, NY (US)

(72) Inventors: Ming Qun Chi, Beijing (CN); Si Bin Fan, Beijing (CN); Peng Hui Jiang, Beijing (CN); Qiang Song, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/070,114

(22) Filed: Mar. 15, 2016

(65) Prior Publication Data

US 2017/0091238 A1     Mar. 30, 2017

Related U.S. Application Data

(63) Continuation of application No. 14/870,180, filed on Sep. 30, 2015.

(51) Int. Cl.
    *G06F 17/30*      (2006.01)

(52) U.S. Cl.
    CPC .. *G06F 17/30321* (2013.01); *G06F 17/30548* (2013.01)

(58) Field of Classification Search
    CPC ......... G06F 17/30011; G06F 17/30321; G06F 17/30548; G06Q 10/10
See application file for complete search history.

(56) References Cited

U.S. PATENT DOCUMENTS

| | | | |
|---|---|---|---|
| 6,401,239 B1 | 6/2002 | Miron | |
| 8,205,150 B2* | 6/2012 | Gelman | G06F 3/0481 |
| | | | 715/229 |
| 8,316,292 B1 | 11/2012 | Verstak et al. | |
| 8,793,242 B2 | 7/2014 | Gherman et al. | |
| 8,898,122 B1 | 11/2014 | van Rotterdam et al. | |
| 8,949,247 B2 | 2/2015 | Torbjornsen | |
| 9,069,767 B1* | 6/2015 | Hamaker | G06F 17/30011 |
| 9,275,368 B1* | 3/2016 | Harpalani | G06Q 10/10 |
| 9,448,769 B1* | 9/2016 | Katoch | G06F 8/30 |
| 2005/0015716 A1* | 1/2005 | Lavoie | G06Q 40/02 |
| | | | 715/255 |
| 2005/0027758 A1* | 2/2005 | Meller | G06F 8/68 |
| 2008/0270396 A1 | 10/2008 | Herscovici et al. | |

(Continued)

OTHER PUBLICATIONS

He et al., "Compact Full-Text Indexing of Versioned Document Collections", 2009 ACM, CIKM '09, Nov. 2-6, 2009, 10 pages.

(Continued)

*Primary Examiner* — Tarek Chbouki
(74) *Attorney, Agent, or Firm* — Reza Sarbakhsh

(57) ABSTRACT

According to an embodiment of the present disclosure, it is determined whether a delta index is beneficial based on the difference between a first version and a second version of a document, wherein the first version is associated with a first index comprising a plurality of keywords appeared in the first version. The delta index is generated for the difference between the first and second versions if the delta index is beneficial, wherein the delta index comprises a first section including information about one or more keywords affected by the difference and the information about the positions of the affected keywords.

1 Claim, 9 Drawing Sheets

(56) References Cited

U.S. PATENT DOCUMENTS

2009/0013009 A1 1/2009 Nakayama
2014/0032513 A1 1/2014 Gaither

OTHER PUBLICATIONS

IBM: List of IBM Patents or Patent Applications Treated as Related (Appendix P), Nov. 10, 2016, pp. 1-2.
Chi et al., U.S. Appl. No. 14/870,180, filed Sep. 30, 2015, titled "Generation and Use of Delta Index,", pp. 1-30.

* cited by examiner

GENERATION AND USE OF DELTA INDEX

BACKGROUND

The present invention relates to data processing, and particularly, to text retrieval and index.

Studies have shown that the volume of information will be doubling every two years. How to use these information resources and discover the value of them has become a key issue. Search by means of indexes is one of the major uses.

An existing technique for this use is inverted index. It is an index data structure storing a mapping from content, such as words or numbers, to its locations in a database file or in a document or a set of documents. By means of inverted index, fast full text searches can be performed. In general, an inverted index may include a plurality of terms (e.g., words or numbers) and a same number of posting lists each of which records the location related information of a term in one or more documents. As the volume of information grows, it is desirable to have more efficient techniques for index and text retrieval.

SUMMARY

According to one embodiment of the present invention, there is provided a computer-implemented method. In the method, it is determined whether a delta index is beneficial based on the difference between a first version and a second version of a document, wherein the first version is associated with a first index comprising a plurality of keywords appeared in the first version. The delta index is generated for the difference between the first and second versions if the delta index is beneficial, wherein the delta index comprises a first section including information about one or more keywords affected by the difference and the information about the positions of the affected keywords.

According to another embodiment of the present invention, there is provided a system comprising one or more processors, a memory coupled to at least one of the processors, and a set of computer program instructions stored in the memory and executed by at least one of the processors in order to perform an action of determined whether a delta index is beneficial based on the difference between a first version and a second version of a document, wherein the first version is associated with a first index comprising a plurality of keywords appeared in the first version; and generating the delta index for the difference between the first and second versions if the delta index is beneficial, wherein the delta index comprises a first section including information about one or more keywords affected by the difference and the information about the positions of the affected keywords.

According to another embodiment of the present invention, there is provided a computer program product comprising a computer readable storage medium having program instructions embodied therewith. The program instructions are executable by a processor to cause the processor to determine whether a delta index is beneficial based on the difference between a first version and a second version of a document, wherein the first version is associated with a first index comprising a plurality of keywords appeared in the first version; and to generate the delta index for the difference between the first and second versions if the delta index is beneficial, wherein the delta index comprises a first section including information about one or more keywords affected by the difference and the information about the positions of the affected keywords.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4A shows an example of existing inverted index;

FIG. 4B shows example indexes generated according to an embodiment of the present disclosure;

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As mentioned above, one of the major uses is text retrieval or full text search by means of indexes. The existing inverted index is designed for documents that are read-only or not subject to frequent changes. In this case, one complete index is sufficient. However, documents are often updated or revised, by one or multiple persons. For example, a document may be composed by multiple persons collaboratively. Different versions may be created from one root version, since different users or roles may have different views on one single document. In theory, any change will generate a new version of content or cause generation of a new file. In prior art, one general way is to regenerate a complete index for the new version and discard the old index for the previous version. Thus, searches can be conducted against the latest version. This is sometimes undesirable, especially in enterprise content management, because people may want to search not only the latest version, but also previous versions in order to find possible values of big data.

In order to provide full text search for multiple versions of one document, the existing solution is to create a complete index for each version, thereby resulting in multiple separate indexes. However, sometimes the document may be modified only to a limited extent. For example, the new version may include only some small changes (such as name, location, and date), or only corrections of some typos or punctuation marks. Creating a complete index for each version may result in redundant data and waste storage resource. In addition, a conventional inverted index is often for multiple documents. Thus, where one of the documents has a minor change, the whole index needs to be regenerated even if the other documents are unchanged.

Embodiments of the present disclosure are provided to solve at least some of the above problems. The implementation details of the embodiments will be described with reference to FIGS. 1-9.

Figure 1:
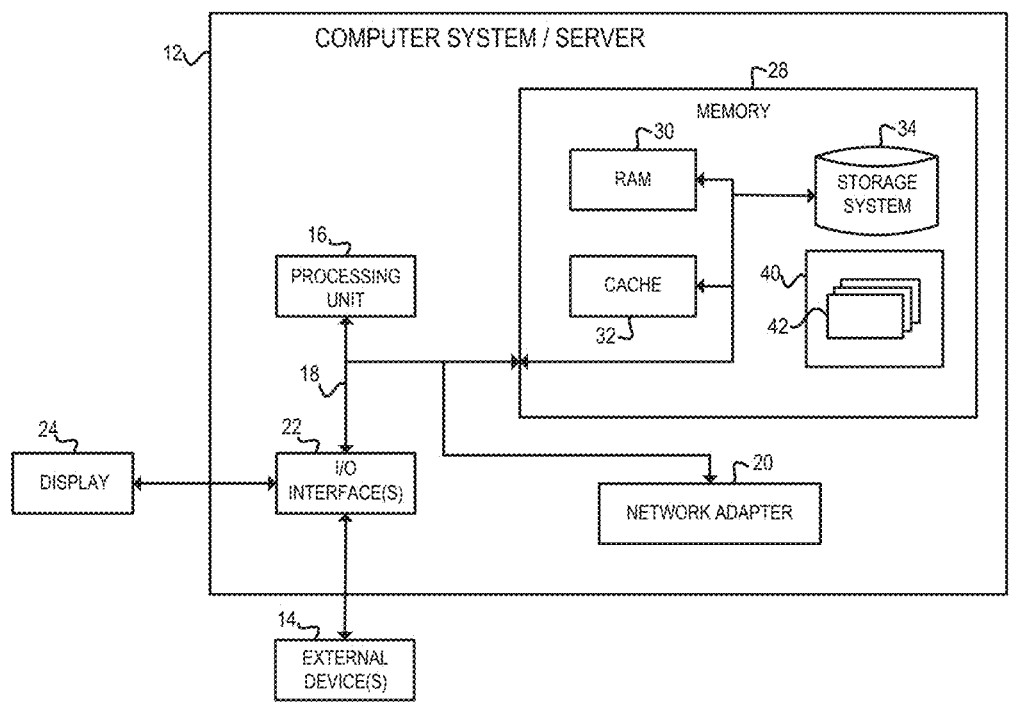
FIG. 1 shows an exemplary computer system which is applicable to implement some embodiments of the present invention.

Referring now to FIG. 1, which shows an exemplary computer system/server 12 applicable to implement some embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
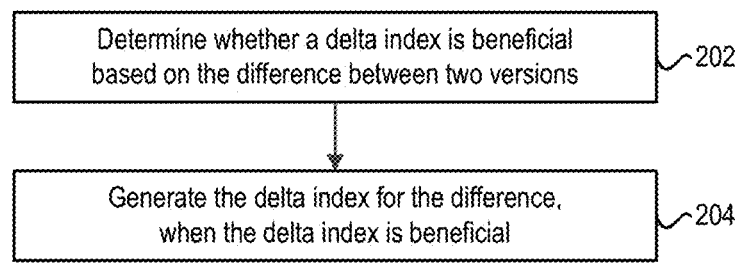
FIG. 2 is a flow chart showing the process of index generation according to an embodiment of the present disclosure.

FIG. 2 shows the process of index generation according to an embodiment of the present disclosure. As shown in FIG. 2, at step 202, it is determined whether a delta index is beneficial based on the difference between a first version and a second version of a document. This step may be performed for example in response to an index generation request from a processing entity, such as a processor located in a document management server, a search engine, a home or office computer and so on. The processing entity may issue the index generation request for example when a new version of the document is created and saved.

The document may be any kind of document including, but not limited to, Word document, PDF document, web page, email message, PPT document, one note message, RTF document, TXT document, XML file, HTML file and so on. The second version may be an immediate revision of the first version, or may be a version which is apart from the first version by one or more versions, or may be a version which is generated in parallel with the first version.

In this embodiment, the step 202 comprises two sub-steps. At the first sub-step, the difference between the two versions may be evaluated from at least one of the factors including similarity between the first and second versions, numbers of keywords in the first and second versions, frequencies of the keywords in the first and second versions, and positions of the keywords in the first and second versions. In other words, the degree of difference is measured at this evaluating sub-step.

Specifically, the similarity between the two versions may be measured for example by cosine similarity in vector space model (VSM). Assume that the two versions are version i and version j, and they may be represented as two vectors $d_i=(w_{1,i}, w_{2,i}, \ldots, w_{t,i})$ and $d_j=(w_{1,j}, w_{2,j}, \ldots, w_{t,j})$, respectively, wherein there are t keywords in the union set of the keywords in the two versions, and w represents the frequency of a keyword in version i or version j. Then, the cosine similarity between version i and version j may be calculated as:

$$\cos(\alpha) = \cos(d_i, d_j) = \frac{d_i \cdot d_j}{\|d_i\| \cdot \|d_j\|} = \frac{\sum_{n=1}^{t} w_{n,i} w_{n,j}}{\sqrt{\sum_{n=1}^{t} w_{n,i}^2} \sqrt{\sum_{n=1}^{t} w_{n,j}^2}},$$

where α is the angle formed between the two vectors. The smaller the angle α is, the more similar the two versions are. In other words, the angle α is inversely proportional to the similarity between the two versions, and thus proportional to the difference between the two versions.

The difference in numbers, frequencies or positions of the keywords between the two versions may be determined from the text differences between the two versions. Any existing and future techniques for text comparison can be applied to obtain text differences between the two versions. For example, the existing text comparison algorithms include algorithms based on edit distance, such as Levenshtein Distance, and algorithms based on Longest Common Subsequence, such as Needleman/Wunsch algorithm.

The output of text comparison may be, for example, a list including information about text operations for changing the first version to the second version (e.g., addition, removal or replacement), one or more keywords affected by each text operation (e.g., a keyword may be affected by an addition or removal, and two keywords may be affected by a replacement), and the position of the affected keyword (e.g., the position in the first version at which a text operation occurs).

From the output of text comparison, the difference in the number of the keywords between the two versions may be determined, for example, by calculating the number of the new keywords which have been added by addition and replacement operations and which have not appeared in the first version. Further, the difference in the frequencies of the keywords between the two versions may refer to the difference between the sums of the frequencies of the keywords between the two versions, and may be determined, for example, by subtracting the number of the removals from the number of the additions. Since a replacement may be considered as a combination of a removal and an addition, it has no contribution to the difference in the frequencies of the keywords between the two versions.

Further, the difference in the positions of the keywords between the two versions may be determined, for example, by subtracting the total position change due to all removals from the total position change due to all additions. The position change due to each removal may be calculated, for example, by subtracting the occurrence position of the removal from the maximum keyword position in the first version. The position change due to each addition may be determined, for example, by calculating the absolute value of the difference between the occurrence position of the addition and the maximum keyword position in the first version.

Then, at the second sub-step of step 202, it is determined whether a delta index is beneficial based on the evaluated difference (in other words, the degree of difference). As an example, in a case where the evaluated difference is the similarity between the two versions, it is checked whether the similarity is larger than or equal to a first threshold. The first threshold may be set by a user (e.g., an administrator of a document management server or a search engine). Alternatively, the first threshold may also be set by applying any suitable machine learning algorithms to the index generation and search history data to find the optimum value, wherein the index generation and search history data may be obtained by means of different first thresholds.

In response to a positive check result (i.e., the similarity is larger than or equal to the first threshold), which means that the difference between the two versions is minor, it is determined that a delta index is beneficial. The delta index may refer to an index having information about the difference between the first and second versions, and will be described later in details with reference to step 204. On the other hand, in response to a negative check result (i.e., the similarity is smaller than the first threshold), which means that the difference between the two versions is major, it is determined that a delta index is not beneficial.

As another example, in a case where the evaluated difference is the angle determined from the cosine similarity, or is the difference in numbers, frequencies or positions of the keywords between the two versions or a combination thereof, it is checked whether the evaluated difference is larger than or equal to a second threshold. Similarly as the first threshold, the second threshold may be set by a user, or may be set by applying any suitable machine learning algorithms.

In response to a positive check result (i.e., the evaluated difference is larger than or equal to the second threshold), which means that the difference between the two versions is major, it is determined that a delta index is not beneficial. On the other hand, in response to a negative check result (i.e., the evaluated difference is smaller than the second threshold), which means that the difference between the two versions is minor, it is determined that a delta index is beneficial.

Then, at step 204, the delta index is generated for the difference between the first and second versions, when the delta index is beneficial. As an example, the first version may be associated with a first inverted index comprising a plurality of keywords appeared in the first version, and the delta index may comprise a first section including information about one or more keywords affected by the difference and their positions. As described above, an inverted index may include a plurality of keywords and a same number of posting lists each of which records the location related information of a keyword in one or more documents. The first section may be, for example, a delta inverted index. It should be noted that although the delta index will be described hereinafter by way of example in a context of an inverted index, the principle of the present disclosure may be applied to any other delta index having information about the difference between the first and second versions.

It should be noted that in the above example where the first version is associated with the first inverted index, if cosine similarity is calculated, the frequency of a keyword occurred in version i (i.e., the first version) may be determined from the location related information included in the first inverted index. For each keyword which only occurred in version j (i.e., the second version), the frequency of this keyword in version i is zero.

Optionally, the information about positions of the affected one or more keywords in the first section may include information about addition and/or removal of the one or more keywords. Further, optionally, the position of a keyword and the information about the addition or removal of the keyword may be combined in the first section as one storage unit (e.g., a double-byte). Further, optionally, the delta index may further comprise a second section including information about position changes between the first and second versions. The information about position changes may include information about addition and/or removal of the one or more keywords and their positions. The second section may be used to locate a keyword in the second version when processing a query of the keyword, which will be described later.

Optionally, when it is determined that the delta index is not beneficial at step 202, a complete inverted index may be generated for the second version. The complete inverted index (or a whole inverted index) may be generated by applying any existing algorithms or software products for generating an inverted index for a document.

The above step 204 may include two sub-steps. At the first sub-step, for each text operation (e.g., addition, removal or replacement) included in the text differences, at least one index entry is generated which may comprise at least one keyword affected by the text operation and the position of the keyword. For each addition or removal, one index entry is generated. For each replacement, two index entries are generated, since a replacement may be considered as a combination of a removal and an addition.

Optionally, the index entry may further comprise the identification (ID) of the addition or removal, and/or the frequency of the keyword. The ID of the addition may be, for example, "add" or "+", and the ID of the removal may be, for example, "remove" or "−". Optionally, the ID of the addition or removal such as "+" or "−" and the position of the keyword such as an integer may be combined into a signed position such as a signed integer. The keyword affected by the text operation, its position, the addition or removal, and the frequency mentioned above may be determined from the text differences described above with reference to step 202.

Then, at the second sub-step of step 204, the index entries determined for all text operations are combined such that a first section of the delta index may be formed. Optionally, the first section may further include IDs of the first and second versions. As an example, the ID of the first version may be the file name of the first version, and the ID of the second version may be the version number relative to the first version. Further, optionally, the first section may further include the generation timestamp (e.g., date and time) of the first section. It should be noted that in a case where the entry includes the ID of the addition or removal, all index entries having the same keyword and the same ID of the addition or removal may be combined into one index entry.

Optionally, the above step 204 may further include two optional sub-steps. At the first optional sub-step, for each text operation (e.g., addition, removal or replacement) included in the text differences, at least one entry is generated which may comprise the ID of the addition or removal corresponding to the text operation, and the position of at least one keyword affected by the text operation. Similarly as the above first sub-step of step 204, for each addition or removal, one entry is generated, and for each replacement, two entries are generated. The ID of the addition or removal and the position of the keyword mentioned above may be determined from the text differences described above with reference to step 202. In a case where this first optional sub-step is performed after the first section has been generated, the ID of the addition or removal and the position of the keyword may be read from the first section. Optionally, the ID of the addition or removal such as "+" or "−" and the position of the keyword such as an integer may be combined into a signed position such as a signed integer.

Then, at the second optional sub-step of step 204, the entries determined for all text operations may be combined such that a second section of the delta index may be formed. As an example, the entries for the second section may be arranged in an ascending order of the positions of the keywords affected by the text operations. Optionally, the second section may further include IDs of the first and second versions. Similarly as the first section, the ID of the first version may be the file name of the first version, and the ID of the second version may be the version number relative to the first version.

Figure 3:
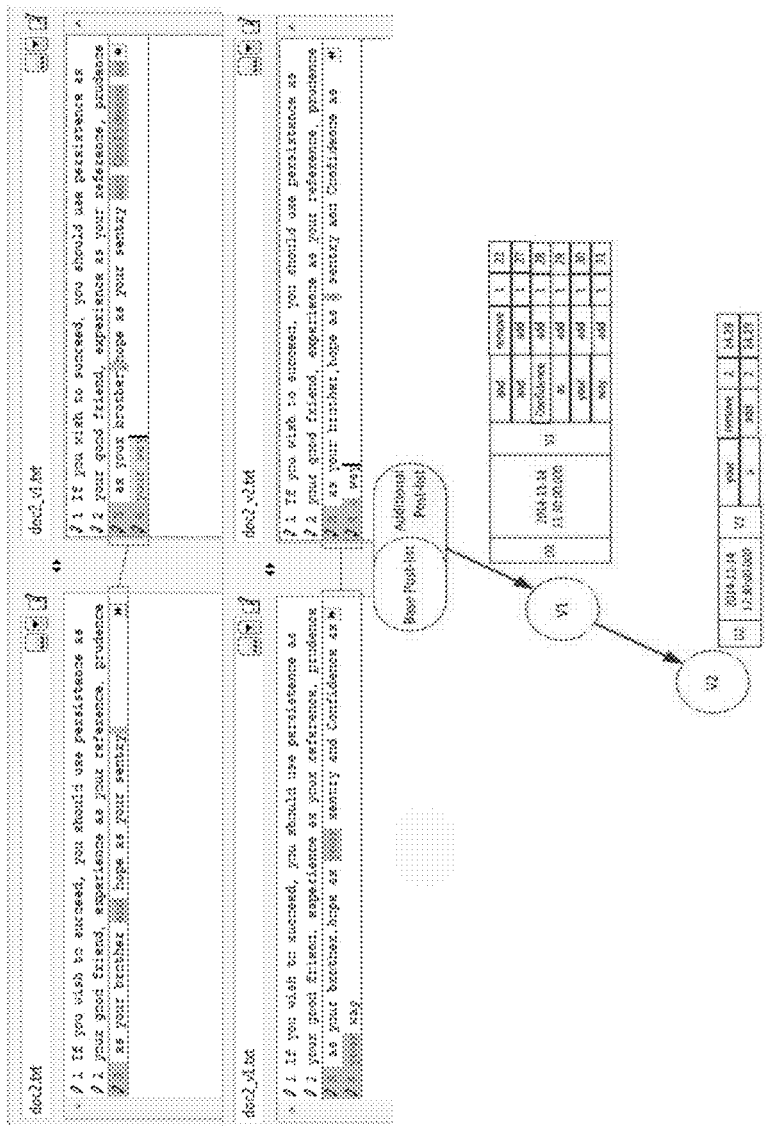
FIG. 3 shows an example document for explaining the process of delta index generation according to an embodiment of the present disclosure.

As to the generation of the first section of the delta index, in an example shown in FIG. 3, there is shown a scenario where a document was modified two times sequentially to generate two versions. The text differences between doc2.txt and doc2_v1.txt and the text differences between doc2_v1.txt and doc2_v2.txt were generated by using Ultra-Compare from IDM Computer Solutions, Inc. For instance, the first entry of the first section (in other words, the delta inverted index) for doc2_v1.txt includes "and" (i.e., the removed keyword), "remove" (i.e., the ID of the removal), "1" (i.e., the frequency of the removed keyword) and "22" (i.e., the position of the removed keyword in doc2.txt). The text differences between doc2_v1.txt and doc2_v2.txt lie in that two keywords "your" were replaced with "a" respectively. Thus, two entries were generated for each replacement, one for the addition and the other for the removal. In this case, two entries for the additions and two entries for the removals were generated, and these four entries were combined into two entries as shown in FIG. 3.

Figure 5:
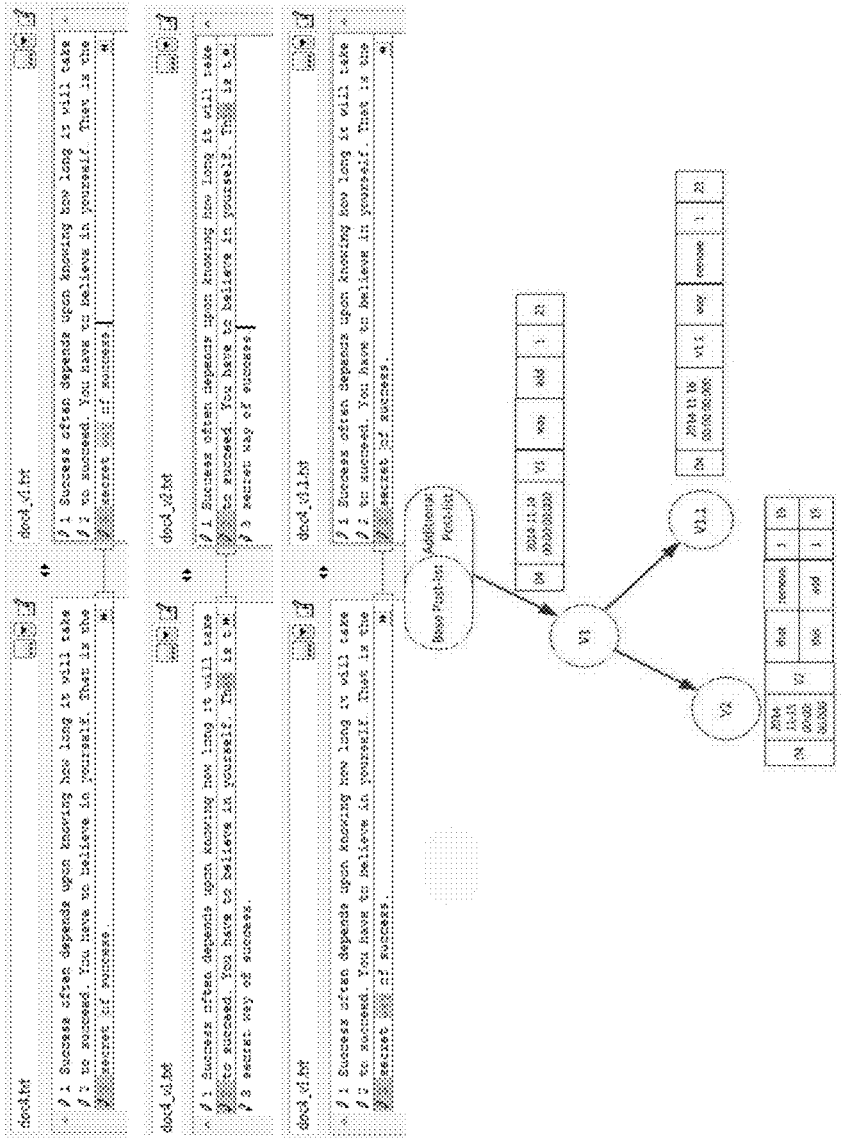
FIG. 5 shows another example document for explaining the process of delta index generation according to an embodiment of the present disclosure.

Further, in another example shown in FIG. 5, there is shown a scenario where a document was modified three times to generate a tree of versions (e.g., two persons may modify the same document in parallel to generate two separate versions). Similarly as FIG. 3, the text differences were generated by using UltraCompare. In this case, two delta indexes for doc4_v1.1.txt and doc4_v2.txt were generated relative to doc4_v1.txt.

In the above examples shown in FIGS. 3 and 5, some stop words such as "and", "a", "as" and so on were deemed as keywords. However, these examples are just exemplary examples for the purpose of illustration. In some use cases (e.g., in a search engine), the stop words may be filtered out from the documents, and then the text differences may be determined from the filtered documents. In this way, the delta index may record only the information about meaningful keywords affected by the difference between the two versions.

Figure 8:
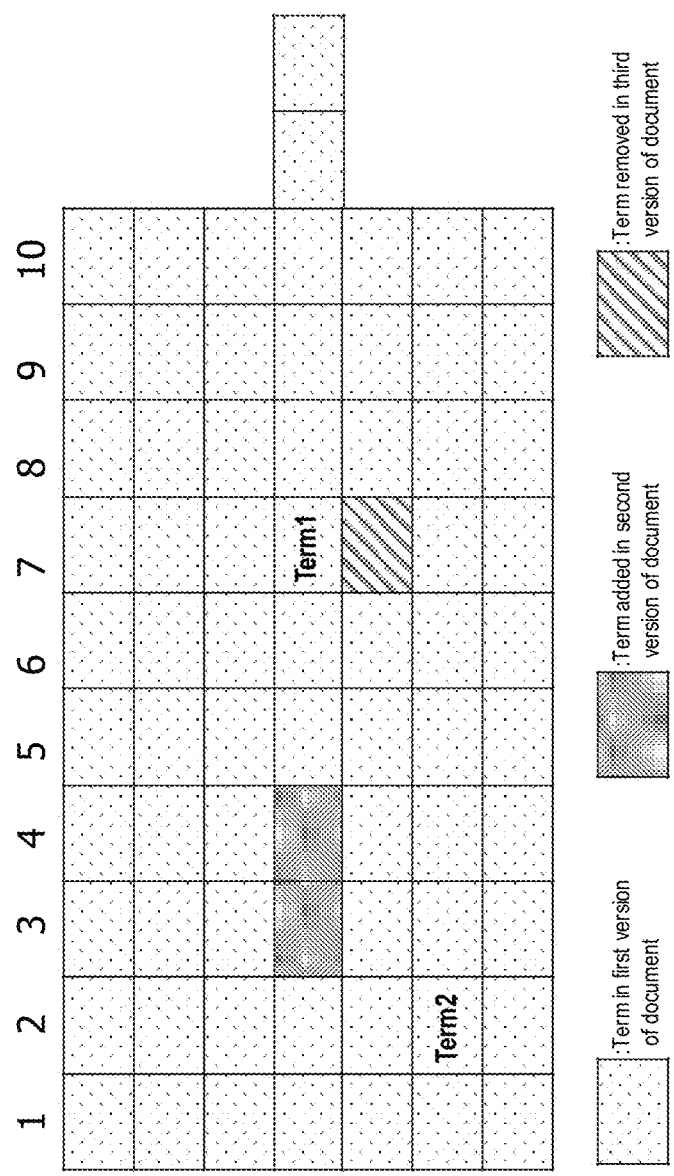
FIG. 8 shows an example for explaining position calculation according to an embodiment of the present disclosure.

As to the generation of the second section of the delta index, in an example shown in FIG. 8, there is shown a scenario where a document was modified such that two additions occurred at positions 33 and 34 and then one removal occurred at position 49. Assume that the document's ID is doc1, the two additions resulted in version v2, and the removal resulted in version v3. Then, the second section for version v2 may be represented as, for example, {Doc1, v2, {33, add}, {34, Add}} or {Doc1, v2, +33, +34}, and the second section for version v3 may be represented as, for example, {Doc1, v3, {49, Remove}} or {Doc1, v3, −49}.

Figure 4A:
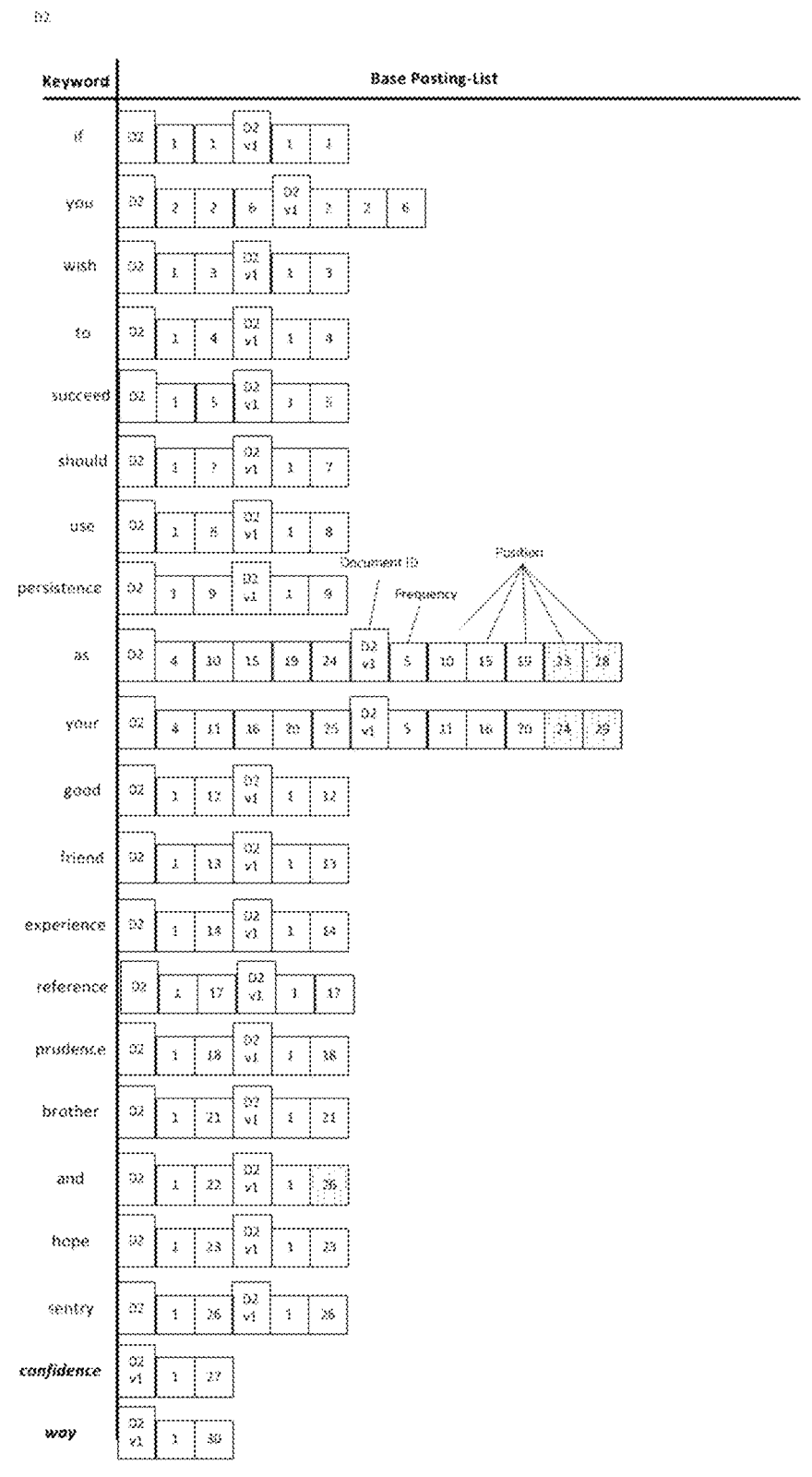

FIG. 4A shows an example of existing inverted index. This inverted index was generated for the example shown in FIG. 3. As shown, two separate complete inverted indexes were generated for the documents D2 and D2_v1, respectively. The inverted index for D2_v1 is substantially the same as that for D2 except that five blocks with black background were added and two frequency values were changed. As a result, the storage space for the indexes is wasted and the processing time for generating the indexes is increased.

Figure 4B:
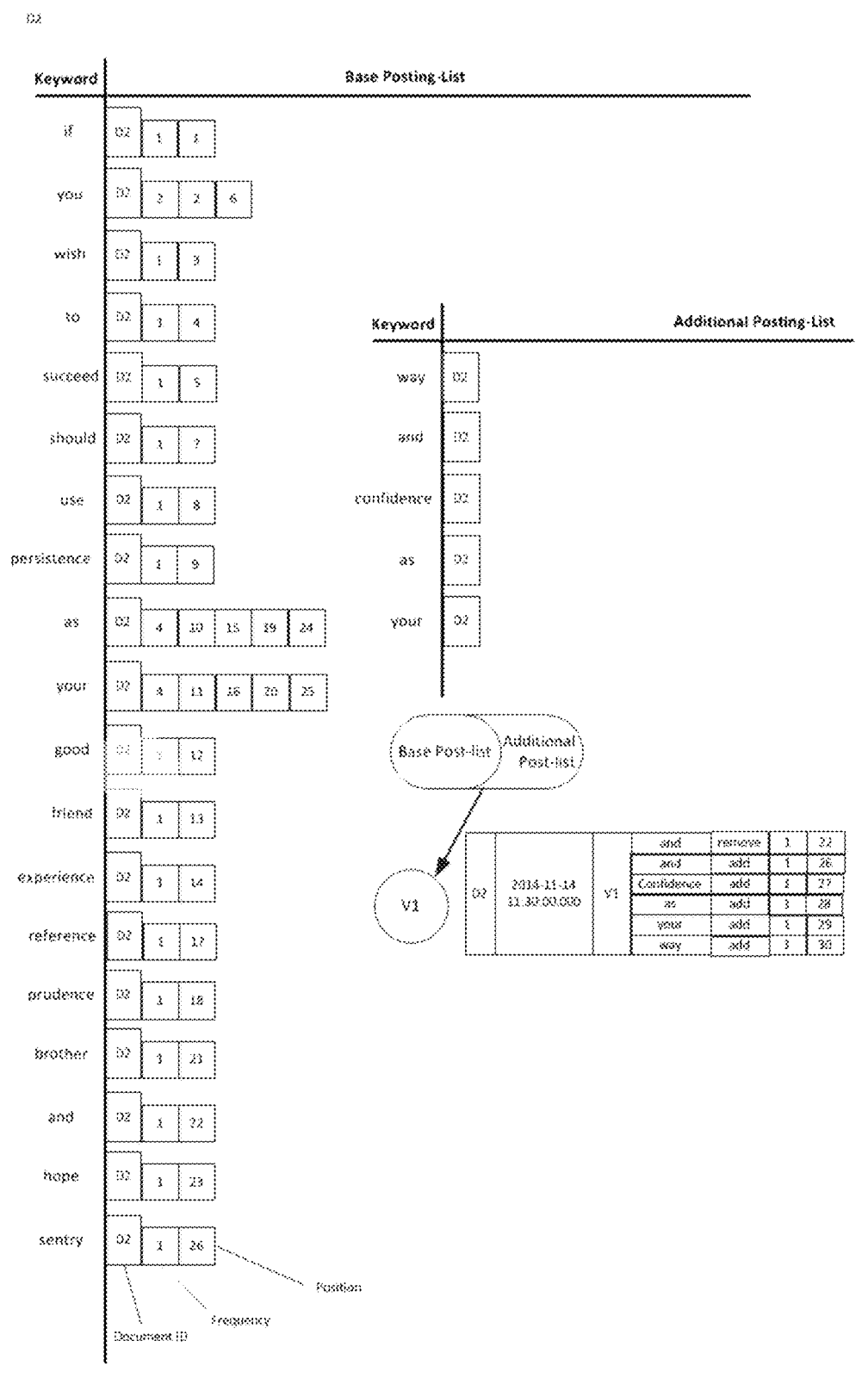

In contrast, FIG. 4B shows example indexes generated according to an embodiment of the present disclosure. As shown, in addition to the complete inverted index for D2, only the first section (also referred to as the delta inverted index) was generated for D2_v1. In this way, the storage space can be saved and the processing time can be reduced.

The storage saving effect can be further illustrated by means of the following table 1, which shows storage costs of the conventional inverted index and an embodiment of the present disclosure. The results shown in this table were obtained by generating indexes for a group of documents, wherein a document ID, a frequency, a position and a keyword each required 4 bytes for storage, a version ID required 2 bytes for storage, and IDs of the addition or removal were not recorded for the delta inverted index. From this table, it can be seen that although the delta inverted index requires more storage for the version ID and keyword, the total storage space required for the delta inverted index can be much smaller than that required for the conventional inverted index. In this example, 42.2% of the storage space can be saved.

TABLE 1

| Method | Doc ID | Frequency | Position | Version | Operation | Keyword | Total Size (Byte) |
|---|---|---|---|---|---|---|---|
| Conventional | 266 | 266 | 524 | 0 | 0 | 134 | 4760 |
| Our disclosure | 138 | 138 | 266 | 6 | 0 | 143 | 2752 |

Figure 6:
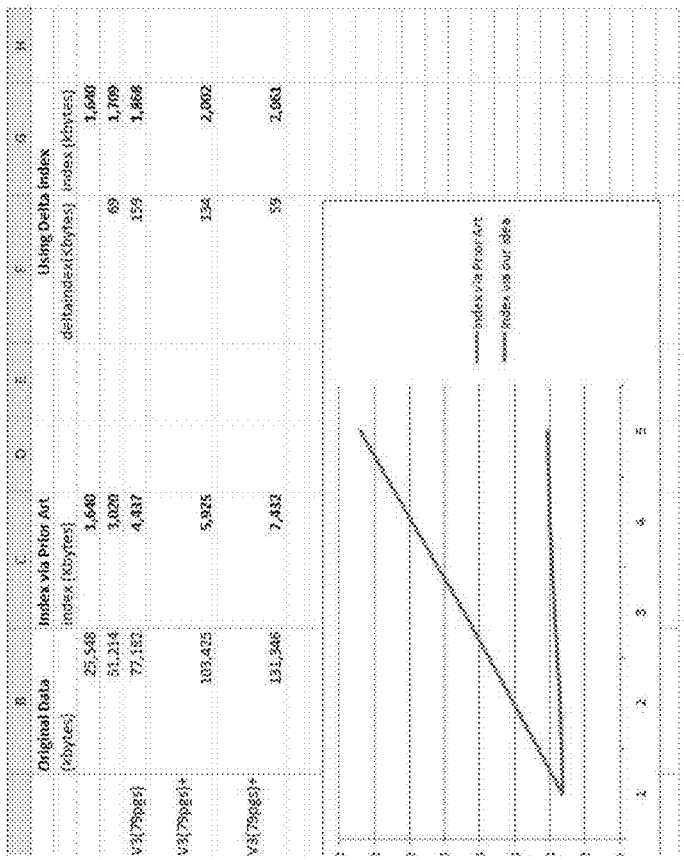
FIG. 6 shows a comparison of storage costs between the conventional inverted index and an embodiment of the present disclosure.

As another example, FIG. 6 shows a comparison of storage costs between the conventional inverted index and an embodiment of the present disclosure. The results shown in FIG. 6 were obtained by using Lucene (an open-source full text search engine) to index documents with different versions. From this figure, it can be seen that as the number of the versions increase, the storage saving effect of an embodiment of the present disclosure becomes more significant.

Now the process of index search according to an embodiment of the present disclosure will be described. As an example of the process, a first version of a document is associated with a complete index, and a second version of the document is associated with a delta index having information about the difference between the first and second versions. The process may include searching for a keyword in the document based on the complete index and the delta index.

As an example of the searching step, the complete index may be for example an inverted index comprising a plurality of keywords appeared in the first version, and may be generated by the complete index generator as described above. The delta index may comprise information about one or more keywords affected by the difference and their positions. The information about positions of the affected one or more keywords in the delta index may include information about addition and/or removal of the one or more keywords. The searching step may include querying the complete index and the delta index for the keyword, and locating the keyword in the second version based on the information of the complete and delta indexes. It should be noted that although the process of index search will be described hereinafter by way of example in a context of an inverted index, the principle of the present disclosure may be applied to any other delta index having information about the difference between the first and second versions.

Optionally, the above query step may be performed in response to a search request received from a user via a processing entity, such as a processor located in a document management server, a search engine, a home or office computer and so on. The search request may include, for example, search criteria (e.g., version, role, data range and so on) specified by the user. According to the search criteria, it is determined whether the search request is related to a delta index. If it is determined that the search request does not relate to any delta index, the conventional search process may be performed.

Further, optionally, if the keyword is found neither in the complete index nor the delta index, the search result may be returned to the user. On the other hand, if the keyword is found in the complete index and/or the delta index, the frequency of the found keyword may be determined.

As an example of the locating step, the delta index may comprise a first section including information about the one or more keywords affected by the difference and their positions, and a second section including information about position changes between the first and second versions. The information about position changes may include information about addition and/or removal of the one or more keywords and their positions. The first section and the second section may be generated as described above with reference to step 204. The locating step may include obtaining the keyword's position in the first version based on the complete index or the first section of the delta index, and calculating the keyword's position in the second version based on the second section of the delta index.

As an example of the obtaining step, the keyword's position in the first version may be read from the complete index when the keyword is found in the complete index, or may be read from the first section of the delta index when the keyword is found in the first section.

Figure 7:
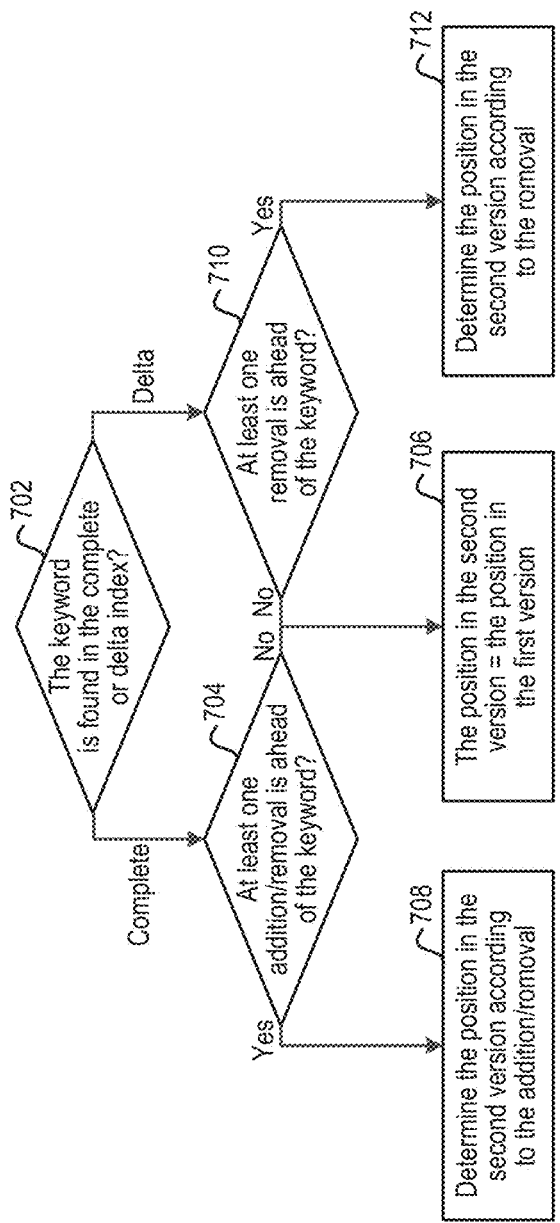
FIG. 7 is a flow chart depicting the process of position calculation according to an embodiment of the present disclosure.

FIG. 7 is a flow chart depicting the process of the calculating step. Optionally, before this calculating step is performed, the user may be queried about whether the position information of the found keyword is needed. If the user does not need the position information, the search result including the determined frequency of the found keyword may be returned to the user. If the user needs the position information, this calculating step may be performed.

At step 702, it is checked whether the keyword is found in the complete index or the delta index. If it is determined at step 702 that the keyword is found in the complete index, it is checked at step 704 whether at least one addition or removal is located in the first version in front of the found keyword. For instance, the position of the at least one addition/removal may be read from the second section of the delta index, and may be compared with the keyword's position in the first version.

In response to a negative check result at step 704 (i.e., there is no addition or removal located in the first version in front of the found keyword), the position of the found keyword in the second version is determined as the position of the found keyword in the first version at step 706. On the other hand, in response to a positive check result at step 704 (i.e., there is at least one addition or removal whose position is smaller than the position of the found keyword in the first version), the position of the found keyword in the second version is determined in accordance with the at least one addition or removal at step 708. For instance, for each addition, one is added to the position of the found keyword in the first version. Further, for each removal, one is subtracted from the position of the found keyword in the first version. As a result, the position of the found keyword in the second version equals to the position of the found keyword in the first version plus the number of the additions minus the number of the removals.

On the other hand, if it is determined at step 702 that the keyword is found in the delta index, it is checked at step 710 whether at least one removal is located in the first version in front of the found keyword. For instance, the position of the at least one removal may be read from the second section of the delta index, and may be compared with the keyword's position in the first version.

In response to a negative check result at step 710 (i.e., there is no removal located in the first version in front of the found keyword), the position of the found keyword in the second version is determined as the position of the found keyword in the first version at step 706. On the other hand, in response to a positive check result at step 710 (i.e., there is at least one removal whose position is smaller than the position of the found keyword in the first version), the position of the found keyword in the second version is determined in accordance with the at least one removal at step 712. For instance, for each removal, one is subtracted from the position of the found keyword in the first version. As a result, the position of the found keyword in the second version equals to the position of the found keyword in the first version minus the number of the removals.

As described above, in the example shown in FIG. 8, there is shown a scenario where a document was modified such that two additions occurred at positions 33 and 34 and then one removal occurred at position 49. Assume that the document's ID is doc1, the two additions resulted in version v2, and the removal resulted in version v3. Then, the second section for version v2 may be represented as, for example, {Doc1, v2, {33, add}, {34, Add}} or {Doc1, v2, +33, +34}, and the second section for version v3 may be represented as, for example, {Doc1, v3, {49, Remove}} or {Doc1, v3, −49}.

Assume that the term 1 and term 2 shown in FIG. 8 are the found keywords, the position of the term 1 in doc1 is 37, and the position of the term 2 in doc1 is 52. Then, according to the second section for version v2, there are two additions located in front of the term 1. Thus, the position of the term 1 in version v2 may be determined as 37+2=39. Further, according to the second section for versions v2 and v3, there are two additions and one removal located in front of the term 2. Thus, the position of the term 2 in version v3 may be determined as 52+2−1=53.

Further, in the example shown in FIG. 3, the second section for doc2_v1.txt may be represented as, for example, {Doc2, v1, {22, remove}, {27, Add}, {28, Add}, {29, Add}, {30, Add}, {31, Add}} or {Doc2, v1, −22, +27, +28, +29, +30, +31}. Assume that the queried keyword is "confidence". Then, the keyword is found in the delta index to be located at position 28. In this case, there is one removal (i.e., the removal at position 22) located in front of the found keyword. Thus, the position of the keyword "confidence" in doc2_v1.txt may be determined as 28−1=27.

Based on the above description, the following advantageous technical effects can be achieved in the present disclosure:

(1) Index can be shared and used for multiple versions of files.
(2) Index space can be saved for contents which only have minor changes.
(3) The computing time required for indexing can also be reduced.
(4) Indexes for multiple versions of contents can be saved and used for search.
(5) The differences between multiple versions of contents can be easily detected and used.
(6) Full text search can be conducted not only based on the latest version, but also on all versions, which is especially suitable for enterprise content management.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    determining a delta index based on a difference between a first version and a second version of a document, wherein the first version is associated with a first index comprising a plurality of keywords appeared in the first version, wherein the step of determining comprises:
        evaluating the difference between the first and second versions from at least one of the factors including:
            similarity between the first and second versions,
            numbers of keywords in the first and second versions,
            frequencies of the keywords in the first and second versions, and
            positions of the keywords in the first and second versions; and
        generating the delta index for the difference between the first and second versions if the delta index meets a first threshold, wherein the delta index comprises a first section including information about one or more keywords affected by the difference and the information about the positions of the affected keywords,
    wherein the information about positions of the affected keywords includes information about addition and/or removal of the one or more keywords,
    wherein the delta index further comprises a second section including information about position changes between the first and second versions; and
    determining, for a at least one keyword, whether the keyword is found in a complete index or the delta index;
    in response to determining that the at least one keyword is in the complete index, performing:
        (a) in response to determining that at least one addition or removal is ahead of the keyword, determining the position of the keyword in the second section of the delta index according to the addition or removal, wherein determining the position comprises subtracting one from the position of the keyword for each removal and adding one to the position of the keyword for each addition;
        (b) in response to determining that no addition or removal is ahead of the keyword, determining the position of the keyword in the second version as being the same as in the first version; and in response to determining that the at least one keyword is in the delta index, performing:
   (a) in response to determining that at least one removal is ahead of the keyword, determining the position of the keyword in the second version according to the removal, wherein determining the position comprises subtracting one from the position of the keyword for each removal; and
   (b) in response to determining that no removal is ahead of the keyword, determining the position of the keyword in the second version as being the same as in the first version.

\* \* \* \* \*